Aug. 6, 1963 T. W. CONGDON 3,100,299

ANALOG TO DIGITAL CODE CONVERTER

Filed June 19, 1961

INVENTOR
THEODORE W. CONGDON

BY W. O. Quesenberry
Claude Funkhouser
ATTORNEYS 3,100,299

ANALOG TO DIGITAL CODE CONVERTER

Theodore W. Congdon, Pittsfield, Mass., assignor, by mesne assignments, to the United States of America as represented by the Secretary of the Navy Filed June 19, 1961, Ser. No. 118,206
4 Claims. (Cl. 340—347)

The present invention relates to an analog to digital code converter, and more specifically to the transformation of an angular position of a shaft to a binary coded electrical quantity through the use of a differential transformer.

It has been the practice to achieve analog to digital code conversion by employing a coded disc which is coated with conductive material for electrical contact with sliding brushes or with contact switch closures. A disadvantage of these means was that no lubricants could be utilized to reduce wear on the code disc since the brushes were electrical connections. Other code devices which utilize core saturation in magnetic fields with interrogation have the disadvantage of yielding a highly distorted output with relatively lower power content.

The instant invention pertains to the use of a differential transformer having an iron slug whose position is adjusted by being mechanically connected to the variable surface of a coded disc. As the iron slug traverses from one side of the transformer electrical centerline to the other side the output shifts 180° thereby giving a sine wave output that a phase detector can convert into plus and minus logic. The arm to which the slug is attached raises and lowers over the surface of the coded disc as the disc rotates. Thus, the present invention has the advantage that no mechanically contacting electrical transmission elements are present. This offers the additional advantage that lubricants may be used. The instant invention also offers the additional advantage in being capable of utilizing the differential transformer which has been highly developed, which is known to be of rugged construction, and which has as its normal output a sine wave. Thus, the device is able to yield the maximum amount of power in its output signal. The coded disc of this immediate invention also offers the advantage of being easily manufactured by mass production techniques, such as stamping from a master die or by using a master die and the cavitation process. In summary, therefore, the advantages offered by the immediate invention are that it is a rugged and reliable converter of analog to digital information capable of economic and simple advantages in the manufacture thereof as well as in the operation thereof. This invention embraces the advantages of prior code converter systems and none of the aforedescribed disadvantages.

Another object is to provide a code converter having only mechanical contacts thereby eliminating electrical contacts and allowing lubrication of the mechanical portions thereof.

A further object of the invention is the provision of a code converter which is both economical and simple to manufacture and operate.

Other objects and many of the attendant advantages of this invention will be readily appreciated as the same becomes better understood by reference to the following detailed description when considered in connection with the accompanying drawings wherein.

Figures 1, 2:
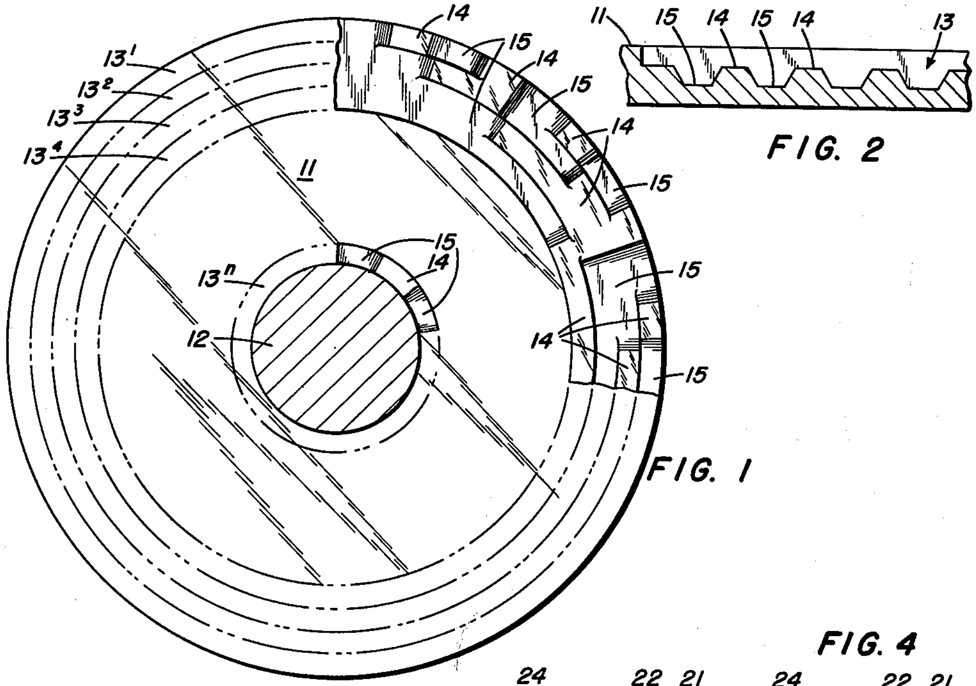
FIG. 1 is an end elevation, partly in section, of the shaft with a coded disc attached thereto.
FIG. 2 is a side elevation of a portion of the coded disc.

Referring now to the drawings, wherein the reference characters designate like or corresponding parts throughout the several views, there is shown in FIG. 1 a disc 11 connected to the end of a shaft 12. Code disc 11 comprises a plurality of code tracks and indentations, $13^1$, $13^2$, $13^3$, $13^4$ and $13^n$. The number of tracks will depend upon the size of the disc and the number of binary digits desired to represent the shaft position. Each track 13 is coded in such a manner that the track is a series of hills 14 and valleys 15. FIG. 2 sets forth a side view of one of the tracks showing with clarity the hills 14 and valleys 15 in the code disc 11.

The code disc may be produced by a stamping process from a master disc or by use of a master die and the cavitation process. Both methods of producing such a coded disc are highly economical and lend themselves to mass production.

Figures 3, 4, 6:
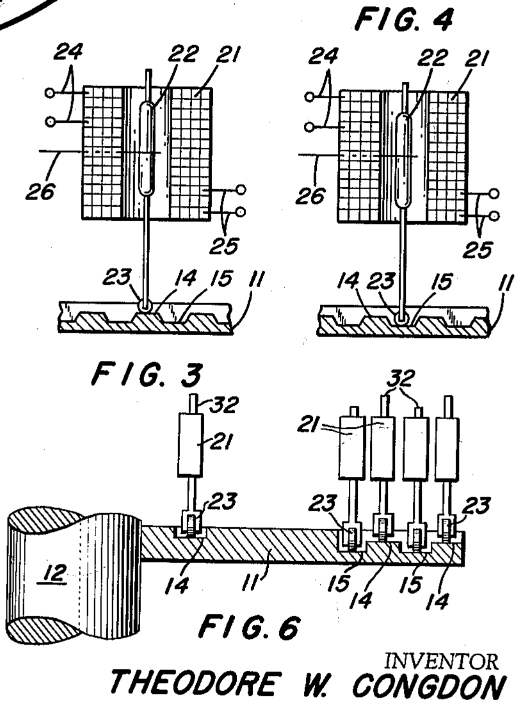
FIG. 3 and FIG. 4 illustrate the respective positions of the iron slug within the differential transformer to thereby derive therefrom the respective outputs of a binary 1 and a binary 0.
FIG. 6 is a schematic diagram showing separate differential transformers in each of the coded tracks of the coded disc.

The relationship between the code disc 11 and the differential transformer 21 are best seen in FIGS. 3 and 4. Differential transformers are commercially available in sizes as small as one-half inch outside diameter and two inch length. Maximum outputs are available with a slug displacement as low as plus or minus .01 inch. Typical excitation frequencies are fifty to one thousand cycles per second. The iron slug 22 is caused to rise or fall above or below the electrical centerline 26 of the differential transformer 21 in response to a wheel or stylus 23 which rides over the hills 14 and valleys 15 of a track 13 in the code disc 11. Stylus or wheel 23 is mechanically connected to the iron slug 22 and as it reciprocates from one side of the electrical centerline 26 of the differential transformer 21 to the other side of the transformer's electrical centerline in response to rotation of the code disc 11 the output 25 of the transformer is made to either be in phase or 180° out of phase with the transformer reference voltage 24. That is, assuming that when the iron slug 22 is displaced above the electrical centerline 26, as can be seen in FIG. 3, the output voltage 25 is in phase with the input reference voltage 24. The output voltage 25 will be 180° out of phase in FIG. 4 when the iron slug 22 is displaced beneath the electrical centerline 26. This is due to the differential transformer characteristic that at a certain critical position of the iron slug in relation to the electrical centerline of the differential transformer windings zero voltage will be measured at the output of the transformer. Thus, when the slug is displaced at one side of the electrical centerline, a voltage will be observed at the transformer output which bears a fixed phased relation to the input reference excitation voltage, and which increases in magnitude as the displacement of the slug from the electrical centerline increases. It is this phase relationship which determines whether a binary 1 or 0 has been sensed from the code disc.

One differential transformer and its associated wheel and slug would be provided for each track. There is no need, however, for all the differential transformers to be along a radial line from the center of the code disc. Due to the volume of the differential transformers, it may be desirable to space them around the disc. If the differential transformers are not, however, placed along a radial line extending from the center of the disc the code tracks must be shifted on the discs so that at the zero shaft position all slugs are suitably positioned in the zero state and all the differential transformer electrical outputs are in the correct phase to read out zero data.

Figure 5:
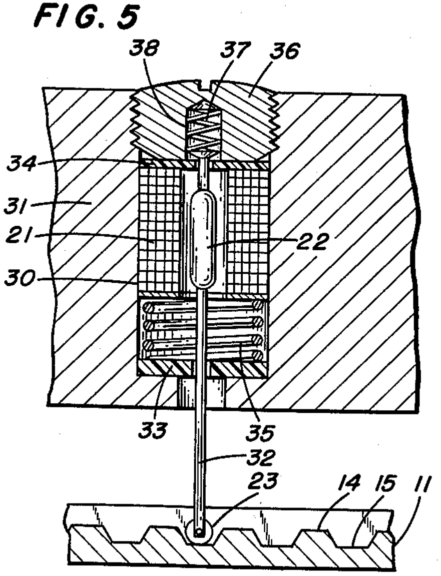
FIG. 5 is a plan view, in section, of the differential transformer and the adjustment and support means therefor.

As is best seen in FIG. 5, the differential transformers may be supported in a bracket 31. The differential transformer 21 is placed in a cavity 30 in the support bracket 31. The position of the transformer may be adjusted by an adjusting screw 36 and a spring 35. The shaft 32 to which the slug 22 is attached is spring mounted by the attachment thereto of a spring 37 in cavity 38 internal of the adjusting screw 36. Nylon or Teflon bearings 33 and 34 are employed to guide the movement of the shaft 32 along its upward and downward motions. Thus, logical zero and one voltage representations can readily be adjusted to be minus and zero, minus and plus, or zero and plus, respectively. The wheel 23, shaft 32, and track 13 may be produced from hard materials to reduce wear.

Obviously, many modifications and variations of the present invention are possible in light of the above teachings. It is, therefore, to be understood that within the scope of the appended claims the invention may be practiced otherwise than as specifically described.

What is claimed and desired to be secured by Letters Patent of the United States is:

1. An analog to digital code converter comprising differential transformer means including at least one differential transformer, adjustable supporting means for said transformer, variable core means for said transformer, reference input voltage means connected to said transformer, coded means, said coded means comprising a disc attached to a rotatable shaft which shaft is adapted to rotate said disc, a plurality of concentric track means on said disc, each of said track means on said disc having a non-uniform surface of hills and valleys, wherein said hills and valleys of one of said plurality of concentric track means are operably connected with said variable core means to thereby vary the output voltage of said transformer as the shaft rotates, contact means for operably connecting said coded means and said variable core means, said contact means comprising a first shaft portion having one end connected to a first side of said variable core means and having a second end with a wheel attached thereto for riding over the hills and valleys of said coded disc, and a second shaft portion having one end connected to a second side of said variable core means and a second end connected to a first compressing spring, said coded means being in a rotatable relationship to said variable core means for varying the position of said variable core means whereby said transformer output voltage represents a digital code.

2. An analog to digital code converter as claimed in claim 1 wherein said adjustable supporting means comprises a support bracket having a cavity therein, said cavity extending through said support bracket and comprising a first portion of a larger diameter than a second portion, said first portion being threaded at the opening thereof, a guide bearing at the base of said larger diameter for guiding the reciprocation of said first shaft portion, a second compressible spring between said first guide bearing and said threaded opening, said differential transformer being between said compressible spring and said threaded opening, a second guide bearing between said differential transformer and said threaded opening for guiding the reciprocation of said second shaft portion, an adjusting screw threaded into said threaded opening for adjusting the position of said differential transformer against said second compressible spring and a second cavity internal of said adjusting screw having said first compressible spring therein to thereby provide pressure upon said second shaft portion and thereby upon said coded disc.

3. An analog to digital converter as claimed in claim 2 wherein said differential transformer means comprises a plurality of differential transformers each of which is operably connected to any one of said plurality of concentric track means.

4. An analog to digital code converter comprising a rotatable shaft, a coded disc attached to said rotatable shaft, said coded disc having a plurality of code tracks of hills and valleys, each of said code tracks being operably connected to a separate differential transformer, adjustable support means for said differential transformers, said differential transformers including a reference input voltage, output terminals, windings having an electrical centerline, and a variable core means, said adjustable support means including a support bracket having at least one aperture therethrough, said aperture including a first portion having a smaller diameter than a second portion, said second portion having a threaded portion at the surface opening of said second portion, said adjustable support means further including a guide bearing at the base of said second portion having an outer diameter smaller than said second portion and an internal diameter smaller than said first portion for the reciprocation of said variable core means, a first compressible spring between said first guide bearing and said threaded portion, differential transformer windings between said first compressible spring and said threaded portion, a second guide bearing between said differential transformer windings and said threaded portion for guiding the reciprocation of said variable core means, and an adjusting screw threaded into said threaded portion for adjusting the position of said differential transformer against said first compresible spring, said variable core means including an iron slug, a first shaft portion connected at one end to one side of said iron slug and at its other end to a second compressible spring, a cavity internal of said adjusting screw for holding said second compressible spring, a second shaft portion connected at one end to a second side of said iron slug and at its other end to a wheel held under pressure of said second compressible spring in one of said rotating code tracks for travel over said hills and valleys of said code tracks whereby said first shaft portion reciprocates through said second guide bearing and said second shaft portion reciprocates through said first guide bearing to thereby reciprocate said iron slug over said electrical centerline and derive an output at said output terminals representative of a digital code.

References Cited in the file of this patent

UNITED STATES PATENTS

| | | |
|---|---|---|
| 2,850,240 | Dickinson | Sept. 2, 1958 |
| 2,881,419 | Rothbart | Apr. 7, 1959 |
| 2,978,561 | Dreyer | Apr. 4, 1961 |
| 2,989,680 | Weiser et al. | June 20, 1961 |